United States Patent [19]

Terada et al.

[11] 4,324,472

[45] Apr. 13, 1982

[54] SWITCH FOR CAMERA

[75] Inventors: Katumi Terada; Michiharu Saito, both of Hachioji, Japan

[73] Assignee: Olympus Optical Company Ltd., Tokyo, Japan

[21] Appl. No.: 40,169

[22] Filed: May 18, 1979

[30] Foreign Application Priority Data

Jun. 14, 1978 [JP] Japan .................................. 53-81240

[51] Int. Cl.[3] ...................... G03B 17/38; H01H 13/70

[52] U.S. Cl. .................................... 354/266; 354/354; 200/159 B; 200/340; 200/264

[58] Field of Search .................. 354/266, 354, 48, 50; 200/159 B, 159 R, 340, 243, 245, 263, 275, DIG. 25, 284, 264; 338/114

[56] References Cited

U.S. PATENT DOCUMENTS

| | | | |
|---|---|---|---|
| 3,946,408 | 3/1976 | Taguchi | 354/266 |
| 3,950,627 | 4/1976 | Murata | 200/159 R |
| 3,988,556 | 10/1976 | Hyodo | 200/264 |
| 4,021,630 | 5/1977 | Taylor | 200/159 R |

*Primary Examiner*—L. T. Hix
*Assistant Examiner*—Stafford D. Schreyer
*Attorney, Agent, or Firm*—Weinstein & Sutton

[57] ABSTRACT

A switch for a camera employs a switching element which is formed of pressure sensitive conductive rubber or conductive rubber, to which an external pressure may be applied to cause it to bridge across a pair of conductive contacts, thus turning the switch on and off. The switch is disposed on the surface of a camera so as to be accessible to an external pressure.

8 Claims, 12 Drawing Figures

SWITCH FOR CAMERA

BACKGROUND OF THE INVENTION

The invention relates to a switch for a camera, and more particularly, to such switch which is formed by a pressure sensitive conductive rubber or conductive rubber.

A camera internally housing an electrical circuit such as one associated with an electrical shutter requires a number of switches including a power switch, a battery check switch, a display operating switch which may be used in examining the result of an exposure, and an electromagnetic shutter release switch. These switches are frequently operated, and a display operating switch must be maintained depressed for an increased period of time to enable a satisfactory display function. It is essential that a camera is not subject to oscillations as a result of operating such switches. Hence, it will be seen that it is desirable to provide a switch of pushbutton type which can be operated by a light touch and which is located adjacent to the surface of a camera so as to facilitate its manual operation.

However, the prior art switch for a camera either comprises a mechanical switch or a piezo electric element which requires an increased stroke and which requires an increased force for its operation, causing difficulty in maintaining the switch depressed for an increased period of time. In addition, members which constitute the switch or its associated peripheral circuit are complex, causing an increased cost, and also require an increased space for the provision of the switch. In addition, it cannot be mounted anywhere on the surface of camera.

SUMMARY OF THE INVENTION

It is an object of the invention to eliminate the described disadvantages of the prior art camera switch, by providing a switch for camera which comprises a switching element formed of a pressure sensitive conductive rubber or conductive rubber to reduce the required stroke and to enable its operation with a soft touch and which can be easily mounted anywhere on the surface of camera without requiring complex associated members or circuit or an increased mounting space.

In accordance with the invention, a switching element which comprises a pressure sensitive conductive rubber or conductive rubber is disposed so as to be brought into contact with or moved away from a pair of conductive contacts of a switch. An external pressure is applied to the rubber to reduce its resistance so that the rubber which is rendered conductive, bridges across the contacts to operate the switch. Consequently, the switch can be operated with a soft touch, permitting the switch to be turned on with a reduced pressure on a switch operating member. It is a simple matter to maintain the switch operated inasmuch as a reduced external pressure is sufficient for its operation. The use of pressure sensitive conductive rubber or conductive rubber as a switching element to provide a simple construction permits it to be inexpensively manufactured, minimizes the space required for its provision, and enables it to be mounted anywhere on the surface of the camera.

BRIEF DESCRIPTION OF THE DRAWINGS

FIG. 13 is a cross section of a switch for a camera according to another embodiment of this invention.

DESCRIPTION OF PREFERRED EMBODIMENTS

Figure 1:
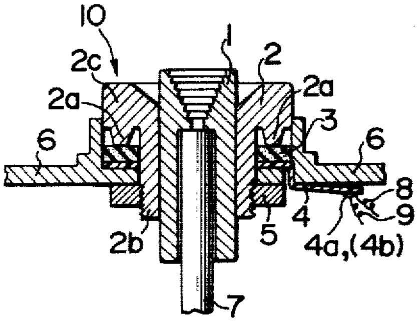
FIG. 1 is a cross section of a switch for a camera according to one embodiment of the invention in which pressure sensitive conductive rubber is used as a switching element.

Referring to FIG. 1, there is shown a switch 10 for a camera which is constructed in accordance with the invention. The switch 10 comprises a switching element formed of pressure sensitive conductive rubber which is disposed about shutter button 1 fitted over shutter release rod 7. Specifically, the switch 10 comprises button seat 2 fitted around shutter button 1 so as to be vertically movable, a ring 3 of pressure sensitive conductive rubber loosely fitted around a lower cylindrical portion 2*b* of the button seat which has a reduced diameter, an electrode base 4 disposed underneath the member 3 and having a portion which is disposed on a stationary plate 6 of the camera and having another portion which is fitted around the cylindrical portion 2*b*, a plurality of projections 2*a* integrally formed on the lower surface of a portion 2*c* of button seat 2 which has an increased diameter, and button seat fastener 5 which threadably engages the cylindrical portion 2*b* in a region below the outer plate 6 of the camera for preventing a withdrawal of button seat 2 upwardly.

Figure 2:
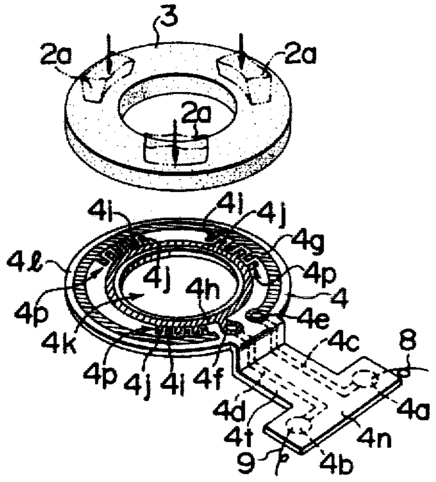
FIG. 2 is an exploded, perspective view of the switch shown in FIG. 1.
Figure 3:
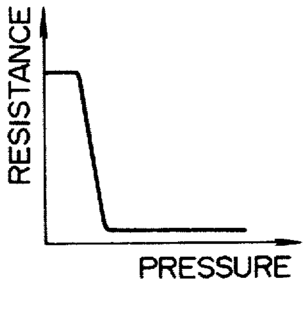
FIG. 3 graphically shows the relationship between the resistance and pressure of pressure sensitive conductive rubber.

As shown in FIG. 2, the ring 3 of pressure sensitive conductive material has the configuration of a dough-nut-shaped disc, and functions as a switching element. As is well recognized, the pressure sensitive conductive rubber comprises rubber having conductive particles mixed therein to render the composition electrically conductive, and is shaped as an elastic sheet having a thickness on the order of 0.5 to 1 mm. FIG. 3 shows the relationship between the resistance and pressure applied to such material. In the free condition of the switching element when no external pressure is applied thereto, it has a high resistance, exhibiting an insulating property which is inherent in the rubber material. However, when an external pressure is applied, the resistance rapidly reduces to make the element electrically conductive. Thus, when the sheet surface is gently pressed with a fingertip, the density of the metal particles will increase in the region where the pressure is applied, reducing the resistance to make the element conductive. When the pressure is removed, the inherent resilience of rubber material restores its original shape, returning to the insulating condition.

The electrode base 4 is formed of a flexible printed board. As shown in FIG. 2, it includes a doughnut-shaped disc 4*l* having a central circular opening 4*k*, extension 4*t* which is folded vertically downward from the periphery of the disc and then extending horizontally, and a rectangular connection board 4*n* which is formed on the free end of the extension 4*t* and which is used for connection with lead wires. The board is provided with a printed wiring which includes a pair of circular leads 4*a*, 4*b* formed on the rear or bottom side of the board 4*n* for connection with lead wires 8, 9, printed patterns 4*c*, 4*d* formed on the bottom surface of the extension 4*t*, a pair of through-hole connections 4*e*, 4*f* formed in the disc 4*l*, and a pair of concentric outer and inner printed patterns 4*g*, 4*h* which are formed on the upper or front surface of the disc 4*l*. The printed patterns 4*g*, 4*h* constitute electrical contacts and are formed with three sets 4*p* of interdigitated projections 4*i*, 4*j*, with these sets 4*p* equi-angularly spaced apart.

The electrode base 4 thus constructed is disposed such that the disc 4*l* is disposed on the outer plate 6 of the camera around the cylindrical portion 2*b*, with the latter extending through the central opening 4*k* formed in the disc 4*l*. The switching element 3 is placed on the both conductive contacts 4*g*, 4*h*, and the projections 2*a* of the button seat 2 rest on the switching element 3. As indicated in phantom line in FIG. 2, there are three projections 2*a* which are located in vertical alignment with the respective sets 4*p* of interdigitated projections.

In operation, when the switch is disposed around shutter button 1, bottom seat 2 may be depressed prior to the depression of shutter button 1 to check the battery voltage or to determine whether the camera is in proper or improper condition for exposure. When button seat 2 is depressed, the projections 2*a* press against the switching element 3, thus applying a pressure thereon. Because the projections 2*a* are disposed in vertical alignment with three sets of interdigitated projections extending from the respective conductive contacts 4*g*, 4*h*, the pressure sensitive conductive rubber of the switching element 3 exhibits a rapidly reduced resistance in those regions where it is pressed by the projections 2*a*. Consequently, the conductive contacts 4*g*, 4*h* are connected together through the pressure sensitive conductive rubber of a reduced resistance which bridges across the sets of interdigitated patterns 4*i*, 4*j*, thus turning the switch 10 on. As a consequence, an indicator circuit may be operated which may be connected across the leads 4*a*, 4*b* through the lead wires 8, 9. The interdigitated pattern of projections 4*i*, 4*j* assures a concentrated application of a pressure from the projections 2*a* upon the pressure sensitive conductive rubber in the region where these projections exist, thus increasing the effectiveness of a change in the resistance of the conductive rubber.

When the button seat 2 is released to remove the pressure from the switching element 3, the latter restores its original shape by its own resilience and returns to an electrically insulating condition. Consequently, the value of resistance between the sets 4*p* of patterns 4*i*, 4*j* and hence between the conductive contacts 4*g*, 4*h* resumes its initial high resistance, turning off the switch 10 to render the indicator circuit inoperative. As the switching element 3 restores its original configuration, its resilience brings the button seat 2 back to its initial position.

Figure 4:
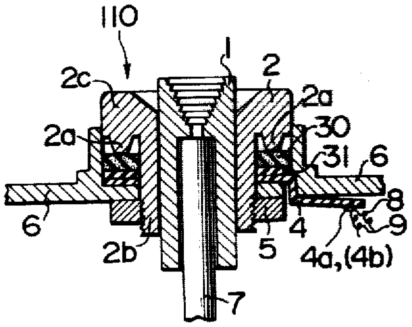
FIG. 4 is a cross section of a switch for a camera according to another embodiment of the invention in which conductive rubber is used as a switching element.
Figure 5:
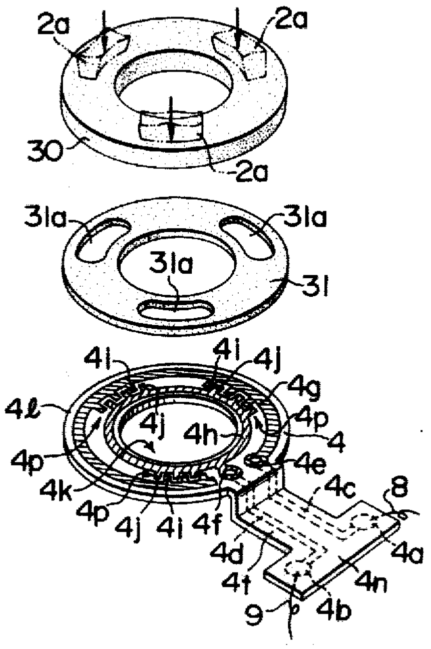
FIG. 5 is an exploded, perspective view of the switch shown in FIG. 4.
Figure 6:
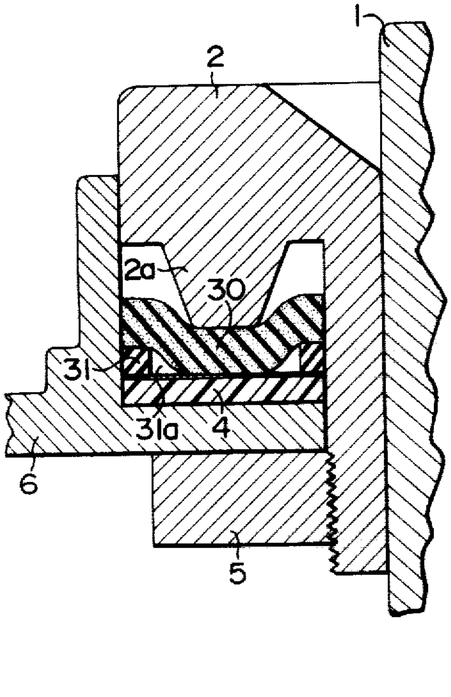
FIG. 6 is an enlarged cross section illustrating the operative condition of the switch shown in FIG. 4.

FIGS. 4 to 6 show another embodiment of the invention in which conductive rubber is used to form the switch of the invention. As is well recognized, conductive rubber comprises a rubber material in which carbon powder is admixed to reduce the electrical resistance of the rubber material itself. It is to be noted that conductive rubber has a reduced electrical resistance in the absence of any pressure applied to the rubber. Thus, it is an electrical conductor and is different in nature from the pressure sensitive conductive rubber mentioned above. When it is used as a switching element, it is used in the same manner as a mechanical switch to be moved mechanically toward or away from conductive contacts in order to turn on and off a switch.

Referring to FIG. 4, there is shown a switch 110 for the camera comprising similar parts as those shown in FIG. 1 and which are disposed around a shutter button. Because the general arrangement is similar to the switch 10 shown in FIG. 1, corresponding parts are designated by like numerals without specifically describing them. One principal difference of the switch 110 over the switch 10 shown in FIG. 1 is the use of conductive element 30 formed by conductive rubber and an insulating sheet 31, the combination of which is substituted for the switching element 3 formed by the pressure sensitive conductive rubber in the switch 10 of FIG. 1. The insulating sheet 31 is placed on top of the electrode base 4 and disposed around the hollow cylindrical portion 2*b* of the button seat 2. The conductive element 30 is placed on the insulating plate 31, and is loosely fitted around the cylindrical portion 2*b*. A plurality of projections 2*a* integrally formed with and extending from the lower surface of the portion 2*c* of the button seat 2 bears against the top surface of the conductive element.

As shown in FIG. 5, the insulating sheet 31 is in the form of a doughnut-shaped disc having a central opening and three arcuate slots 31*a* which are equi-angularly spaced apart. The electrode base 4 shown in FIG. 5 remains the same as that shown in FIG. 2. The sheet 31 is placed on the base 4 in a manner such that the slots 31*a* are aligned with the sets 4*p* of the projections from the printed patterns. As shown in phantom line in FIG. 5, there are three projections 2*a* which bear against the conductive element 30 from above and which are located in alignment with the respective slots 31*a*.

In use, when the switch 110 is not operated, the projections 2*a* are not depressed, so that the conductive element 30 or the rubber material thereof is free from any pressure and hence is held clear from the electrode base 4, maintaining the switch 110 off. However, when the button seat 2 is depressed, the projections 2*a* thereof are pressed against the conductive element 30, whereby the conductive rubber thereof is depressed into the slots 31*a* formed in the insulating sheet 31 and deformed into contact with the electrode base 4, as shown in FIG. 6, thus bridging across the conductive contacts 4*g*, 4*h* through the sets 4*p* of printed patterns. In this manner, the switch 110 is turned on.

When the button seat 2 is released, the rubber material of the conductive element 30 causes the latter to restore its original configuration by its own resilience, thus allowing it to move away from the electrode base 4 to turn the switch 110 off. In this manner, the button seat 2 resumes its initial position.

Figure 7:
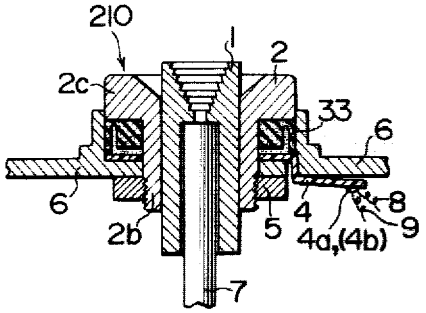
FIG. 7 is a cross section of a switch for a camera according to a further embodiment of the invention in which conductive rubber is used as a switching element.
Figure 8:
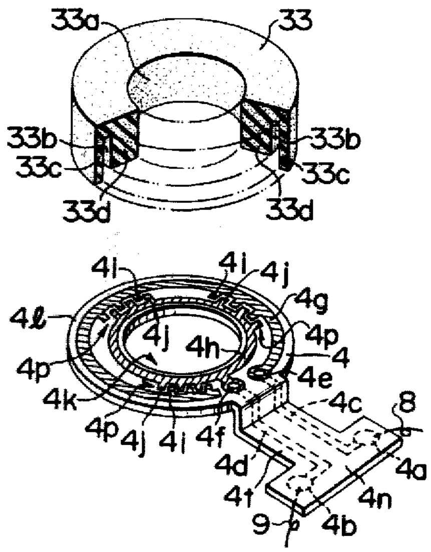
FIG. 8 is an exploded, perspective view of the switch shown in FIG. 7.
Figure 9:
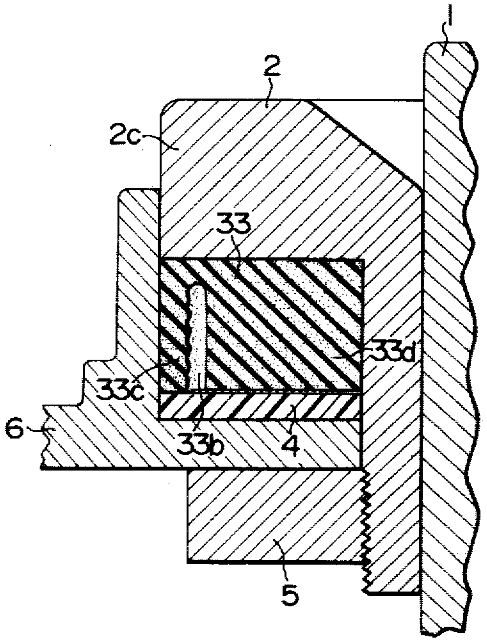
FIG. 9 is an enlarged cross section illustrating the operative condition of the switch shown in FIG. 7.

FIGS. 7 to 9 show a further embodiment of the invention in which conductive rubber is used. Referring to FIG. 7, there is shown a switch 210 for the camera comprising parts which are disposed around a shutter button in the similar as in FIG. 1 or 4. Since the arrangement of these parts are generally similar to that of switches 10, 110, corresponding parts are designated by like numerals and will not be specifically described.

It is to be noted that the switch 210 of FIG. 7 includes button seat 2 which is not formed with projections 2*a*, which served in the previous embodiments to bear against the conductive rubber material. A cylindrical element 33 which is formed of conductive rubber has a substantial radial thickness and a reduced axial length, and is placed on the electrode base 4 so as to be fitted around the cylindrical portion 2*b* of the button seat 2. Its upper surface bears against the bottom surface of the portion 2*c* of the button seat 2. The cylindrical member 33 is formed with a central bore 33*a* which fits around the cylindrical portion 2*b*. As will be noted from FIG. 8, the cylindrical member 33 is formed with a circumferentially extending groove 33*b* of a reduced width which extends relatively deeply into the axial length thereof and opens into the lower surface thereof. It will be seen that the outer wall portion 33*c* which is located outside the circumferential groove 33*b* has an axial length which is greater than that of the inner wall portion 33*d* which is located inside the circumferential groove 33 so that when the cylindrical member 33 is placed on the disc 4*l* of the electrode base 4, only the lower surface of the outer wall portion 33*c* rests on a peripheral region of the disc 4*l* where no printed pattern is formed while the lower surface of the inner wall portion 33*d* is maintained clear from contact with the disc 4*l*.

In use, when the switch 210 is not operated, no pressure is applied to the cylindrical member 33 from the button seat 2, so that the lower surface of the inner wall portion 33*d* thereof remains removed from the electrode base 4, maintaining the switch 210 off. However, when the button seat 2 is depressed, the bottom surface of its portion 2*c* having an increased diameter presses against the cylindrical member 33, which is then deformed as shown in FIG. 9, bringing the bottom surface of the inner wall portion 33*d* into contact with the electrode base 4. In this manner, an electrical conduction is achieved across the sets of the printed patterns 4*p*, and hence across conductive contacts 4*g*, 4*h* formed on the electrode base 4, thus turning the switch 210 on.

When the button seat 2 is released, the resilience of the conductive rubber of the cylindrical member 33 causes it to restore its original form, moving the lower surface of the inner wall portion 33*d* away from the electrode plate 4, thus turning the switch 210 off and bringing button seat 2 back to its initial position.

Figure 10:
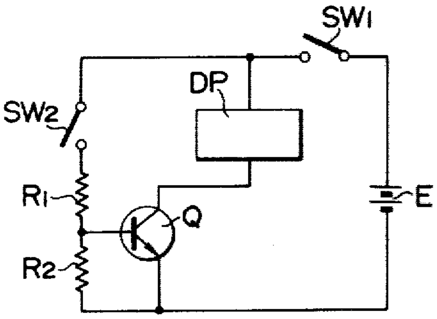
FIG. 10 is a circuit diagram of a display circuit in which the switch of the invention is employed.

FIG. 10 is a circuit diagram of an indicator circuit which illustrates one application of the switch according to the invention. As shown, the circuit includes a d.c. source E having its positive terminal connected with a main switch SW1. Connected in shunt with the series combination of source E and switch SW1 is a series circuit including display circuit DP and transistor Q, and another series circuit including switch SW2 and resistors R1, R2. It is to be noted that switch SW2 is constructed in accordance with the invention using pressure sensitive conductive rubber or conductive rubber. Transistor Q has its base connected with the junction between resistors R1, R2. Display circuit DP may have the function of checking a battery voltage or indicating the proper or improper exposure. After main switch SW1 is closed, the depression of camera switch SW2 to make it closed allows a base current to be supplied to transistor Q through a path including source E, main switch SW1, camera switch SW2 and resistor R1. The base current flows through the base-emitter junction of the transistor to turn it on. When transistor Q is turned on, the display circuit DP is enabled for its intended operation. Since switch SW2 comprises a switching element formed of pressure sensitive conductive rubber or conductive rubber so as to be operated through a reduced stroke with a light pressure, a user may hold his finger against the camera switch SW2 to maintain it on for a prolonged period of time, thus allowing a reliable recognition of a display provided by the display circuit. It will be understood that when camera switch SW2 is not depressed, it remains off, so that no base current flows to the transistor Q.

Figure 11:
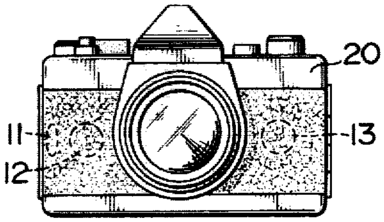
FIGS. 11 and 12 are a front view and a top view of a camera on which the switch of the invention is mounted.
Figure 12:
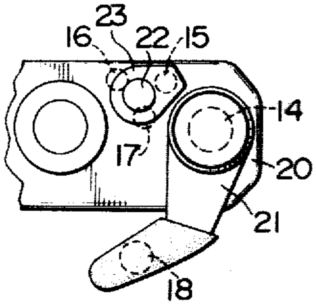

FIGS. 11 and 12 illustrate a suitable location on the surface of the camera where the switch of the invention may be disposed. Because the camera switch of the invention employs either pressure sensitive conductive rubber or conductive rubber to provide a simple construction, it does not require an increased space for its provision, so that it may be disposed anywhere on the camera which is accessible to a finger pressure. By way of example, FIG. 11 shows a location 11 on one side, a location 12 on the front surface toward the right-hand side, or location 13 on the front surface toward the left-hand side or on a rear lid (not shown) of a camera 20 where the switch of the invention can be disposed.

FIG. 12 shows alternative locations for the provision of the camera switch of the invention, including the pivoted end 14 of film winding lever 21 which is disposed on the top surface of the camera 20, locations 15, 16, 17 on a button seat 23 which is disposed around shutter button 22, or on fingertip 18 of the winding lever 21.

It should also be noted that the camera switch of the invention may be disposed on the outer surface of a lens barrel as well.

In the embodiment shown in FIGS. 1 and 2, the switching element formed by the pressure sensitive conductive rubber electrically bridges across conductive contacts formed by printed patterns on the single electrode base 4. However, metal electrodes may be provided on the opposite surfaces of the pressure sensitive conductive rubber so that a change in the resistance of the rubber material achieves an electrical interconnection across the electrodes.

Also, it should be understood that the number of projections 2*a* and sets 4*p* of printed patterns in the embodiment shown in FIGS. 1 to 6 is not limited to three, but may be increased or decreased as desired. Similarly, the size and configuration of these members may be designed in any desired manner.

In the circuit diagram of FIG. 10, the display circuit DP is maintained operative so long as the camera switch SW2 is maintained depressed. However, a timer circuit, as formed by a monostable multivibrator, may be included in the display circuit so that a momentary depression of camera switch SW2 is sufficient to cause an operation of the display circuit for an increased length of time.

While the invention has been described above as applied to the operation of a display or indicator function associated with the camera, it should be understood that it may be used as an electromagnetic release switch or power switch of a camera as well.

What is claimed is:

1. A switch for a camera adapted to be disposed on the surface of said camera including a shutter release button, said switch comprising:

a button seat which surrounds said shutter release button and which is movable independently of and along said shutter release button;

a switching element which is made of a resilient and conductive material, said switching element being disposed beneath said button seat;

a pair of conductive contacts;

said switching element being adapted to bridge across said pair of conductive contacts in response to an external pressure applied to said switching element through said button seat when it is depressed, whereby said switch is rendered conductive.

2. A switch as claimed in claim 1, wherein said switching element is normally in direct contact with said pair of conductive contacts.

3. A switch as claimed in claim 1, further comprising an insulating sheet which has at least one opening formed therein and which is disposed between said switching element and said pair of conductive contacts, said switching element being adapted to be pressed against said pair of conductive contacts through said opening by said external pressure to thereby bridge across said pair of conductive contacts.

4. A switch as claimed in claim 1, wherein said switching element comprises a first portion which is adapted to bear against said pair of conductive contacts in response to said external pressure and a second portion which is disposed out of contact with said pair of conductive contacts, said first portion having a shorter length than said second portion in the direction of said external pressure, whereby said first portion is normally spaced from said pair of conductive contacts in the absence of said external pressure.

5. A switch as claimed in claim 1, 2, 3 or 4, wherein said resilient and conductive material is pressure sensitive conductive rubber.

6. A switch as claimed in claim 1, 2, 3 or 4, wherein said resilient and conductive material is conductive rubber.

7. A switch as claimed in claim 1, 2, 3, 5, or 6, wherein said button seat comprises a plurality of projections for applying concentrated pressure to selected regions of said switching element.

8. A switch as claimed in claim 1, 2, 3, 4, 5, 6, or 7, wherein said shutter release button is movable independently of and along said button seat.

* * * * *